(12) United States Patent
Uesaka et al.

(10) Patent No.: US 9,849,906 B2
(45) Date of Patent: Dec. 26, 2017

(54) STEERING COLUMN DEVICE

(71) Applicant: FUJI KIKO Co., Ltd., Kosai-shi, Shizuoka (JP)

(72) Inventors: Yota Uesaka, Shizuoka (JP); Takuya Adachi, Shizuoka (JP)

(73) Assignee: FUJI KIKO Co., Ltd., Kosai-shi (JP)

( * ) Notice: Subject to any disclaimer, the term of this patent is extended or adjusted under 35 U.S.C. 154(b) by 141 days.

(21) Appl. No.: 15/072,393

(22) Filed: Mar. 17, 2016

(65) Prior Publication Data

US 2016/0280248 A1     Sep. 29, 2016

(30) Foreign Application Priority Data

Mar. 27, 2015  (JP) ................. 2015-066656
Mar. 30, 2015  (JP) ................. 2015-068018

(51) Int. Cl.
*B62D 1/19*    (2006.01)
*B62D 1/18*    (2006.01)
*B62D 1/184*   (2006.01)

(52) U.S. Cl.
CPC ............. *B62D 1/195* (2013.01); *B62D 1/184* (2013.01); *B62D 1/192* (2013.01)

(58) Field of Classification Search
CPC .......... B62D 1/18; B62D 1/184; B62D 1/185; B62D 1/19; B62D 1/192; B62D 1/195
See application file for complete search history.

(56) References Cited

U.S. PATENT DOCUMENTS

| 8,826,769 | B2 | 9/2014 | Takezawa et al. | |
|---|---|---|---|---|
| 8,894,097 | B2 * | 11/2014 | Sulser | B62D 1/184 280/777 |
| 9,623,896 | B2 * | 4/2017 | Uesaka | B62D 1/195 |
| 2003/0160440 | A1 * | 8/2003 | Kahlenberg | B62D 1/181 280/775 |
| 2008/0236326 | A1 * | 10/2008 | Matsui | B62D 1/195 74/493 |
| 2011/0175335 | A1 * | 7/2011 | Takezawa | B62D 1/184 280/775 |

(Continued)

FOREIGN PATENT DOCUMENTS

| CN | 102627119 A | 8/2012 |
|---|---|---|
| CN | 102971197 A | 3/2013 |

(Continued)

OTHER PUBLICATIONS

The European search report dated Aug. 31, 2016 in the counterpart European patent application.

(Continued)

*Primary Examiner* — Barry Gooden, Jr.
(74) *Attorney, Agent, or Firm* — Metrolexis Law Group, PLLC (57) ABSTRACT

A steering column device includes a coupling mechanism that couples an auxiliary restricting member with an inner column when a lock mechanism is in a locked position. In operation, when a load exceeding a set value is applied to the inner column in its cylinder-axis direction, the auxiliary restricting member moves together with the inner column and leaves its engagement with a restricting member, so that the restricting member departs from a restricting position where it can be engaged with the inner column.

7 Claims, 8 Drawing Sheets

(56) References Cited

U.S. PATENT DOCUMENTS

| | | | |
|---|---|---|---|
| 2012/0112443 A1* | 5/2012 | Arakawa | B62D 1/195 280/777 |
| 2013/0118292 A1* | 5/2013 | Sulser | B62D 1/184 74/493 |
| 2016/0159387 A1* | 6/2016 | Okano | B62D 1/184 74/493 |
| 2017/0274922 A1* | 9/2017 | Uesaka | B62D 1/184 |
| 2017/0274923 A1* | 9/2017 | Uesaka | B62D 1/184 |

FOREIGN PATENT DOCUMENTS

| | | | | |
|---|---|---|---|---|
| EP | 3072779 A1 * | 9/2016 | | B62D 1/195 |
| FR | 2840869 A1 | 12/2003 | | |
| JP | 2005-001517 A | 1/2005 | | |
| WO | 2009/121386 A1 | 10/2009 | | |
| WO | 2012/000593 A1 | 1/2012 | | |

OTHER PUBLICATIONS

The official action dated Aug. 30, 2017 in the counterpart Chinese patent application.

* cited by examiner

STEERING COLUMN DEVICE

CROSS REFERENCE TO RELATED APPLICATION

The present application is based on, and claims priority from Japanese Patent Applications No. 2015-066656, filed Mar. 27, 2015, and No. 2015-068018, filed Mar. 30, 2015, the entire contents of all of which are incorporated herein by reference.

TECHNICAL FIELD

The present application relates to a steering column device which enables a telescopic operation and also allows an inner column to be contracted together with a steering shaft by an impact load at a secondary collision of an impact accident, thereby absorbing the impact energy.

BACKGROUND

Figure 1:
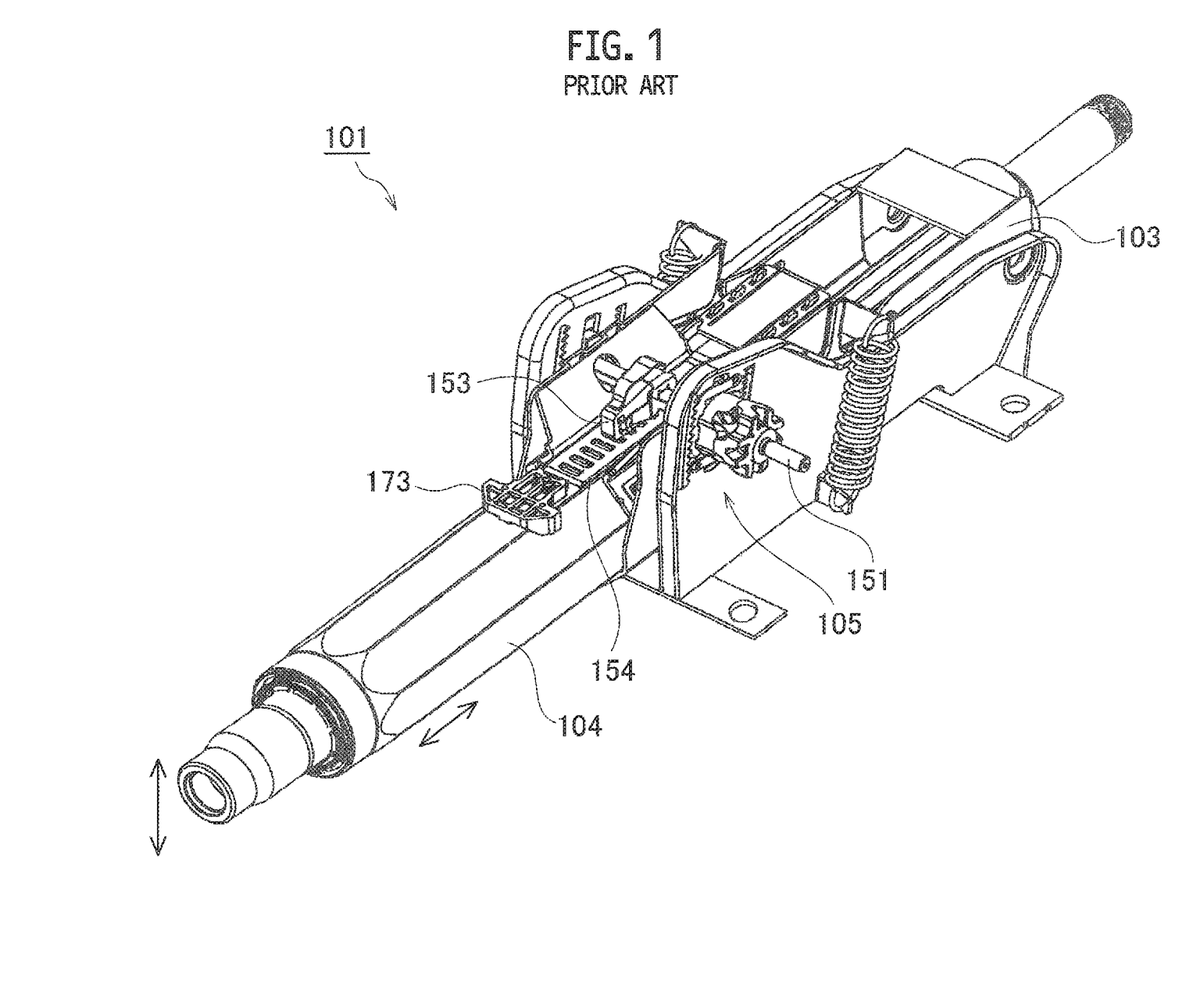
FIG. 1 is a perspective view of a steering column device of a first conventional example.

As this kind of steering column device, Patent Document 1 (WO 2012/000593 A1) describes a steering column device 101 of a first conventional example. As illustrated in FIG. 1, the steering column device 101 includes an outer column 103 fixed to a vehicle body, an inner column 104 arranged so as to be movable in the outer column 103 in a vehicle longitudinal direction, and a fastening member 105 fastening the inner column 104 to the outer column 103. The moving range (telescopic-position adjustment range) of the inner column 104 is defined since a restricting member 173 mounted on the inner column 104 is butted to a lock member 153 arranged on an operating shaft 151 of the fastening member 105. The restricting member 173 is constructed so as to be fractured by a lock plate 154 engaging with the lock member 153 when a load exceeding a set value is applied to the restricting member 173. Owing to the fracture of the restricting member 173, the inner column 104 can move forward over the moving range (telescopic-position adjustment range).

Figure 2:
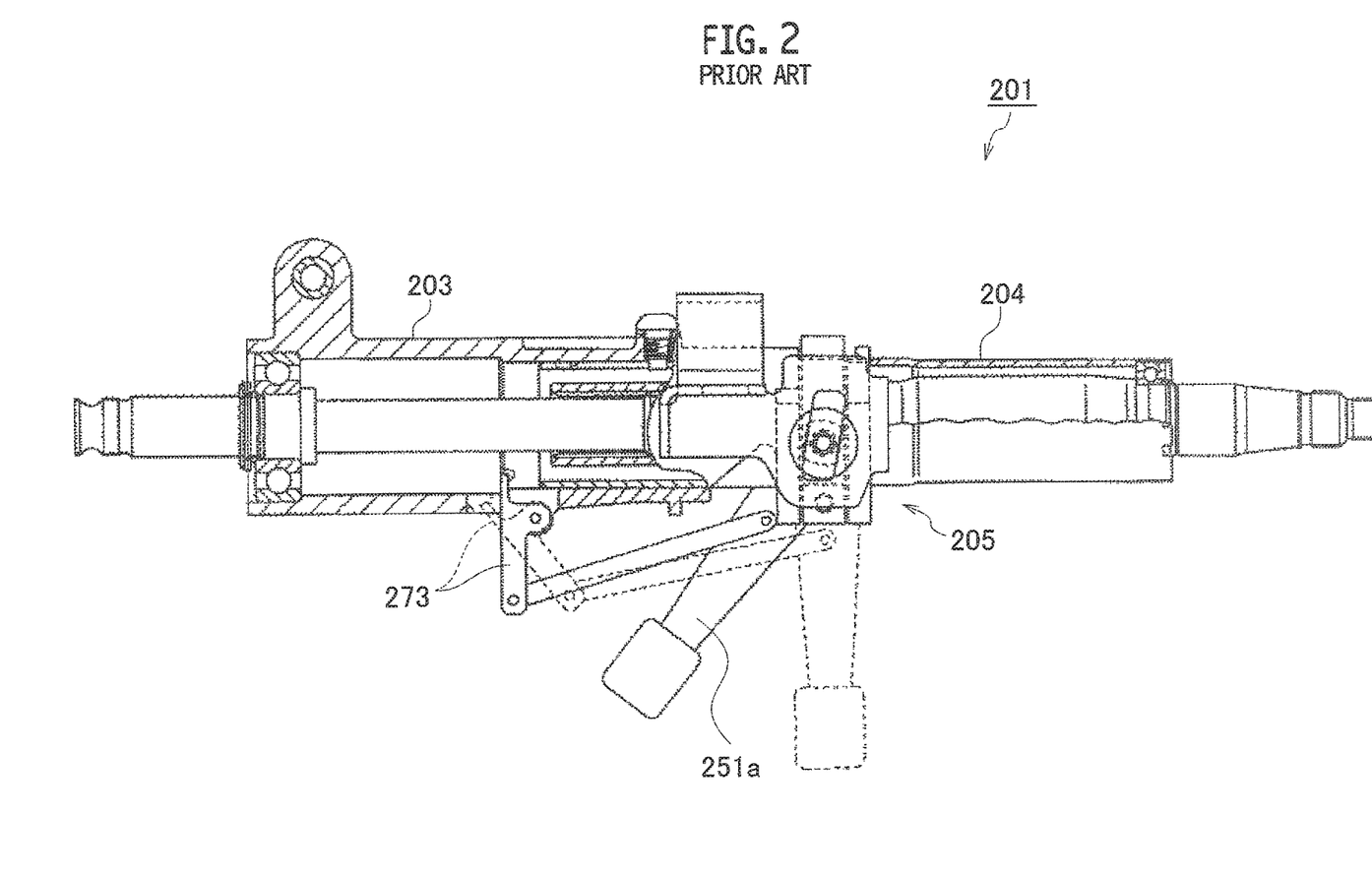
FIG. 2 is a partial-cutaway side view of a steering column device of a second conventional example.
Figure 3:
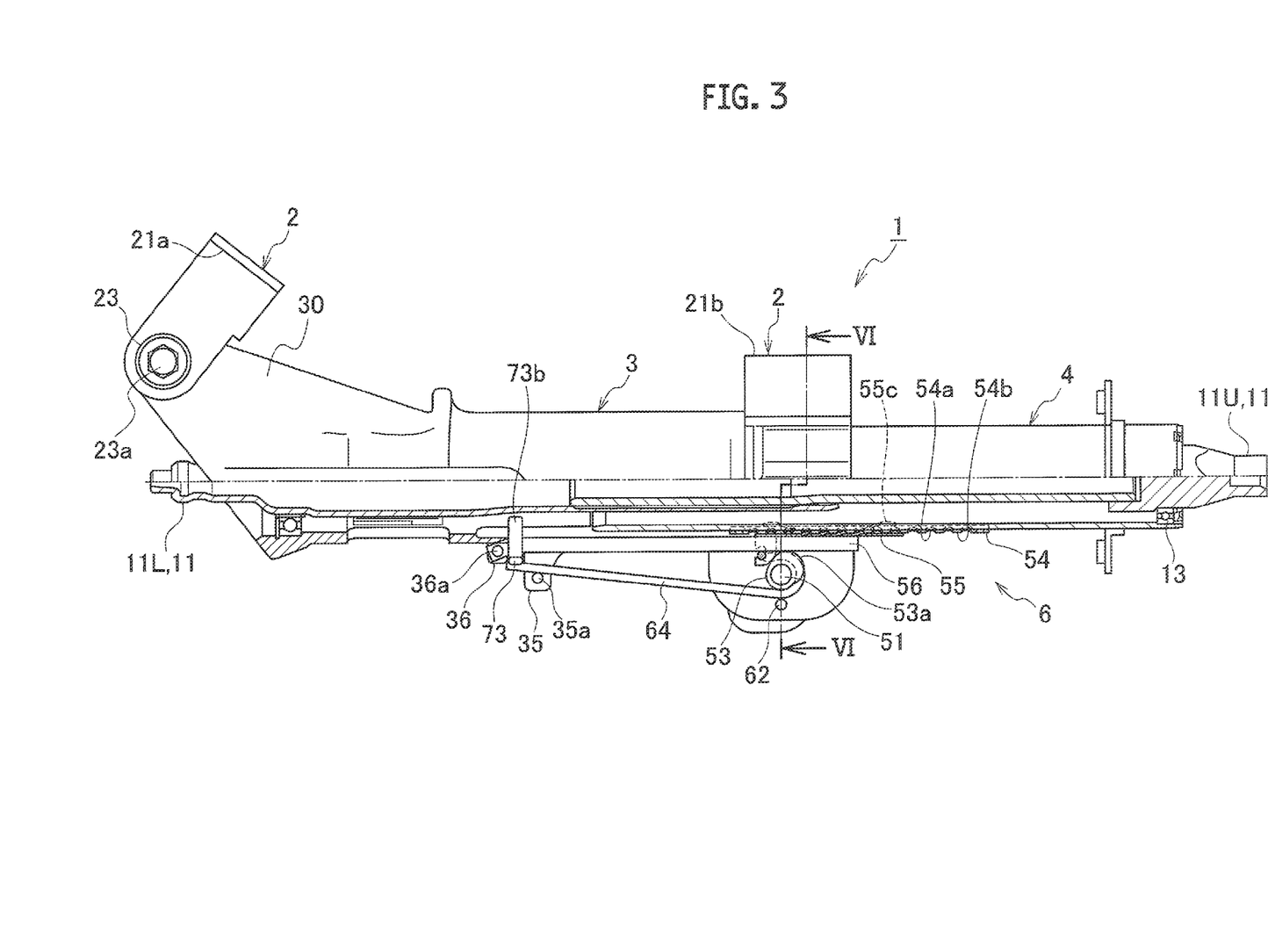
FIG. 3 is left side view of a steering column device according to an embodiment.
Figure 4:
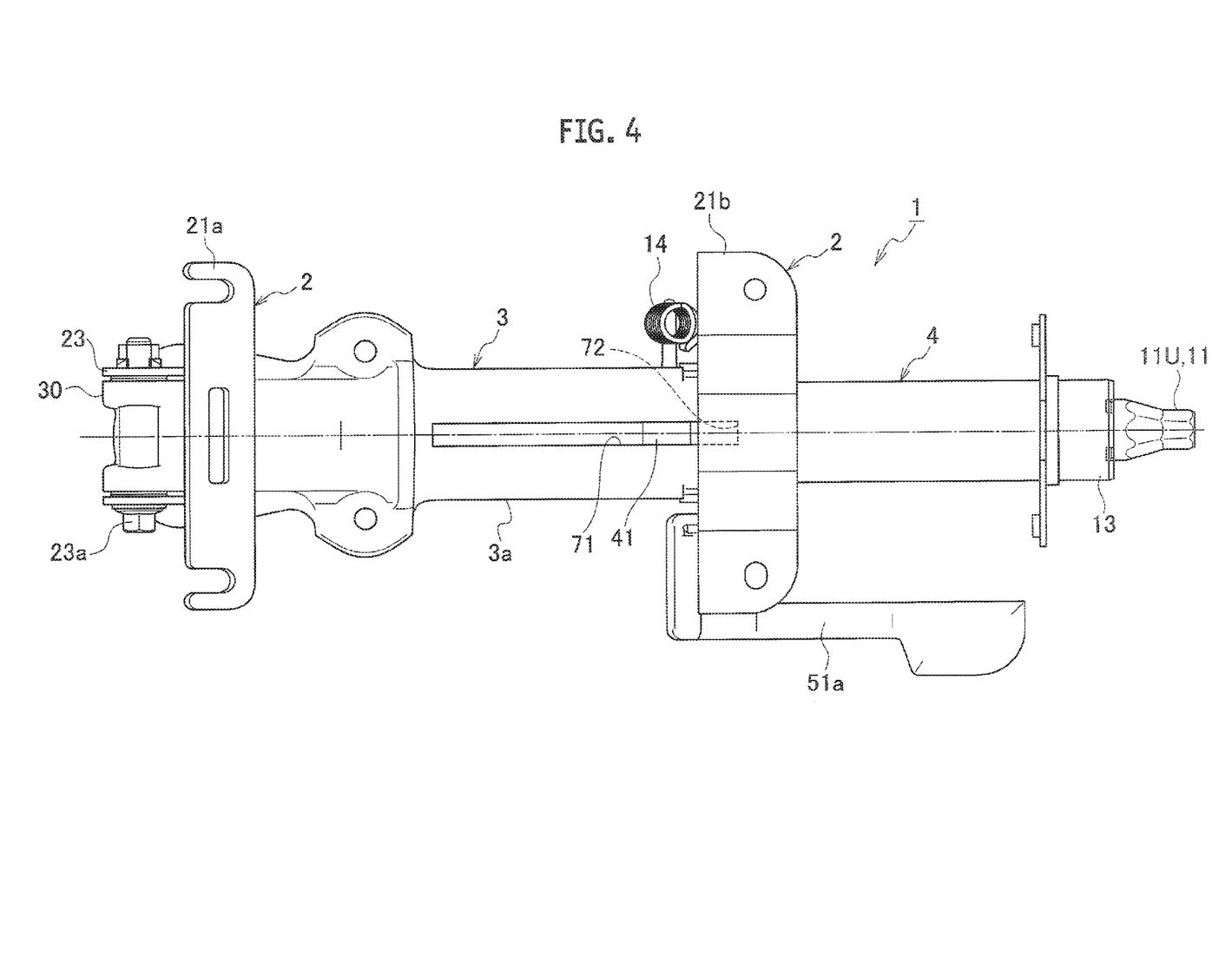
FIG. 4 is a plan view of the steering column device according to the embodiment.
Figure 5:
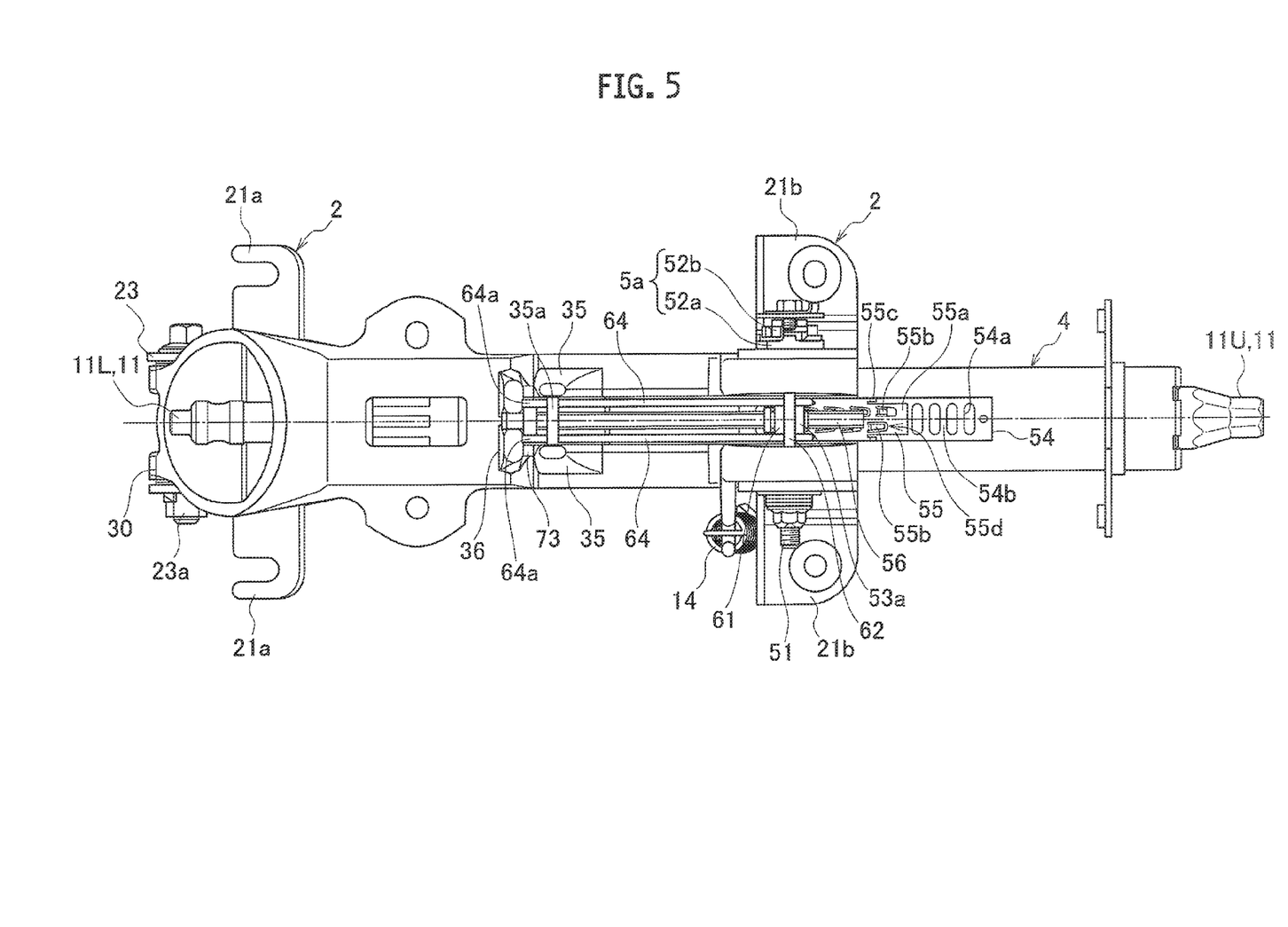
FIG. 5 is a bottom view of the steering column device according to the embodiment.
Figure 6:
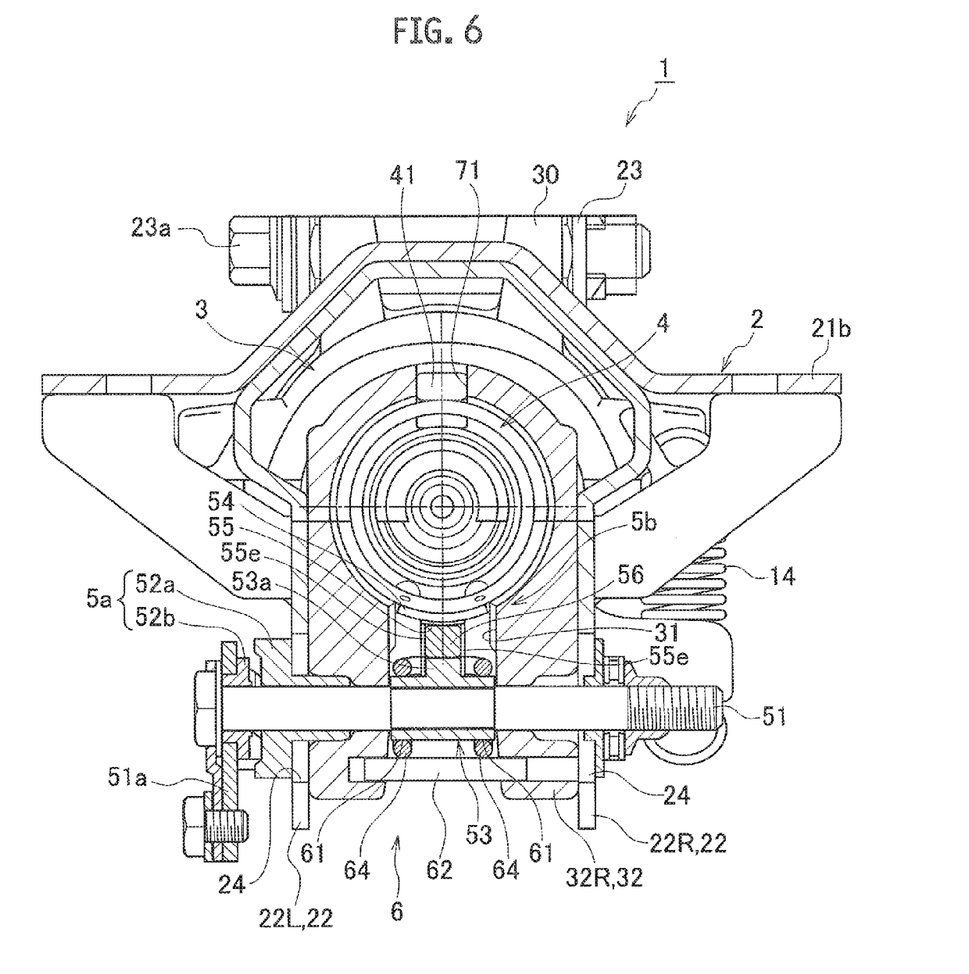
FIG. 6 is a sectional view along a line VI-VI of FIG. 3.
Figure 7:
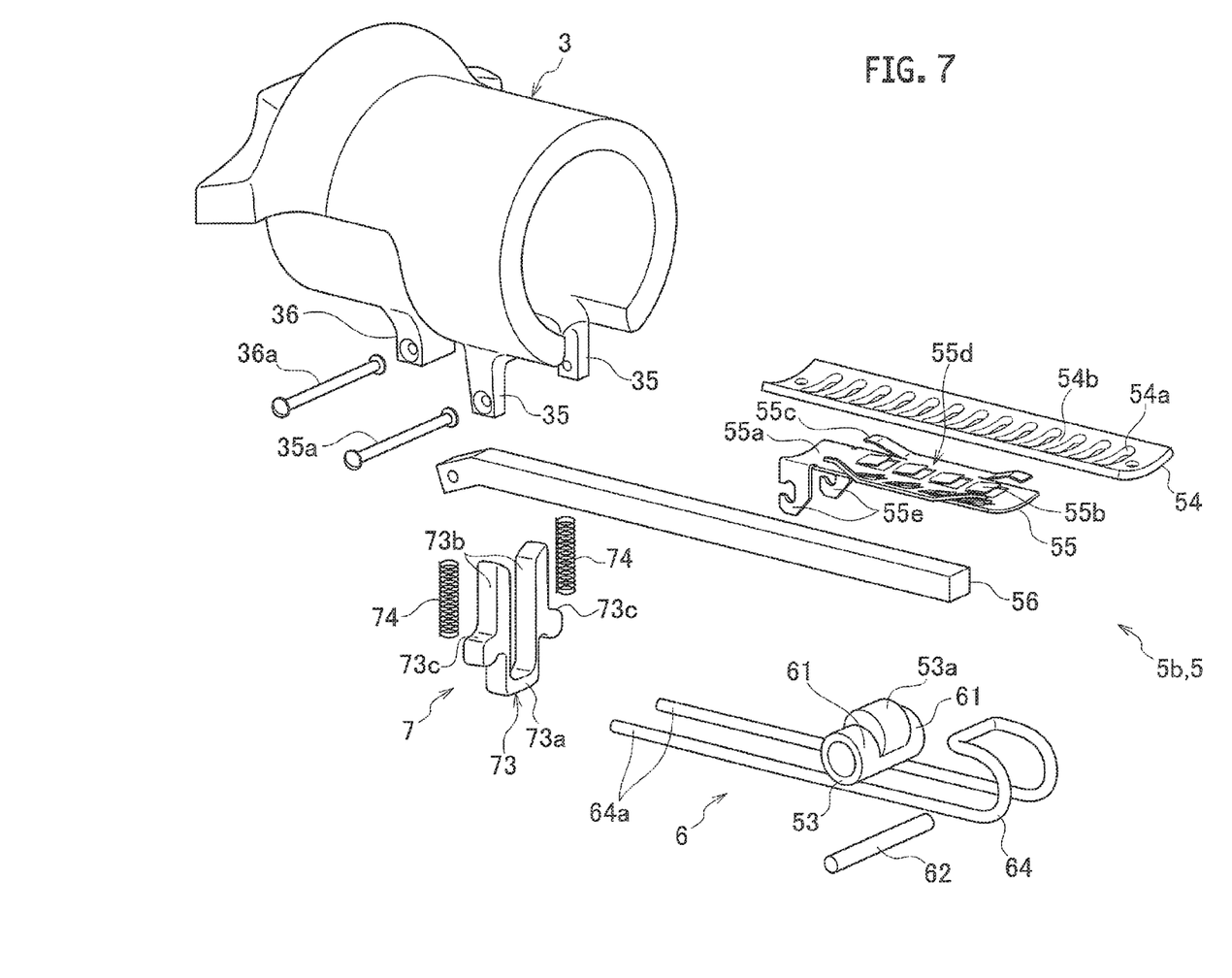
FIG. 7 is an exploded perspective view illustrating the constitution of a lock mechanism and an impact absorbing mechanism of the steering column device according to the embodiment.
Figure 8A:
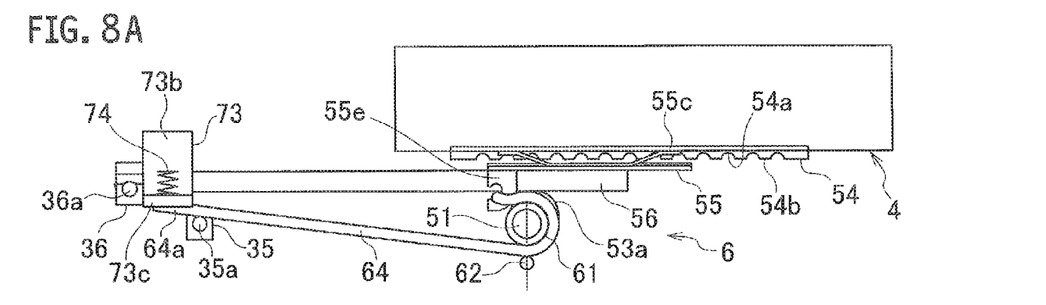
FIG. 8A is a schematic diagram illustrating the operation of the lock mechanism and the impact absorbing mechanism of the steering column device according to the embodiment, in a condition where the lock mechanism is unlocked.
Figure 8B:
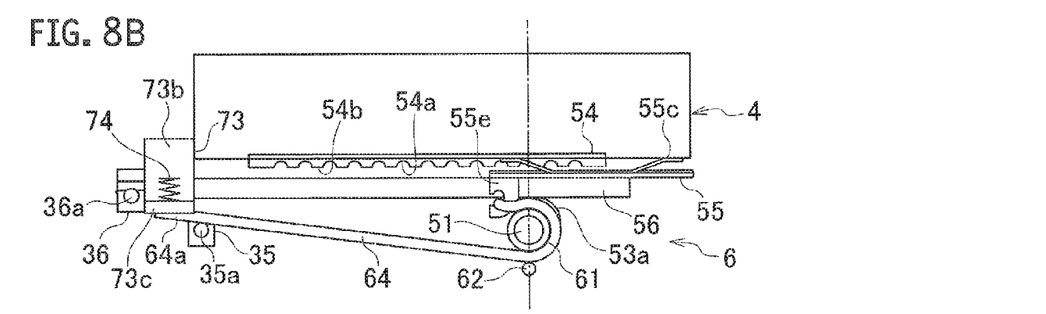
FIG. 8B is a schematic diagram illustrating a condition where an inner column is moved forward upon on condition of unlocking the lock mechanism.
Figure 8C:
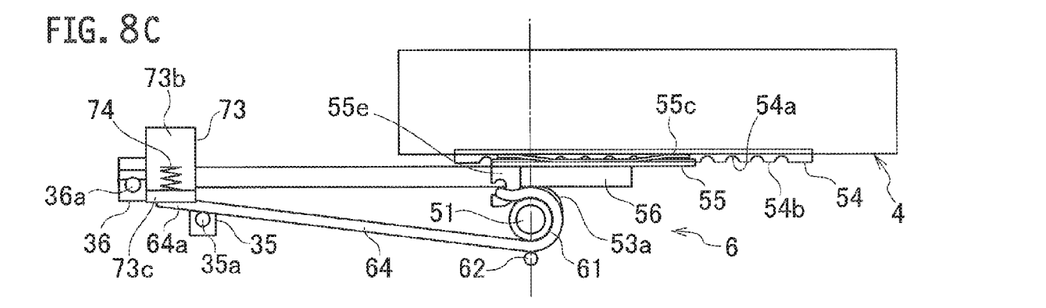
FIG. 8C is a schematic diagram illustrating a condition where the lock mechanism is locked.
Figure 8D:
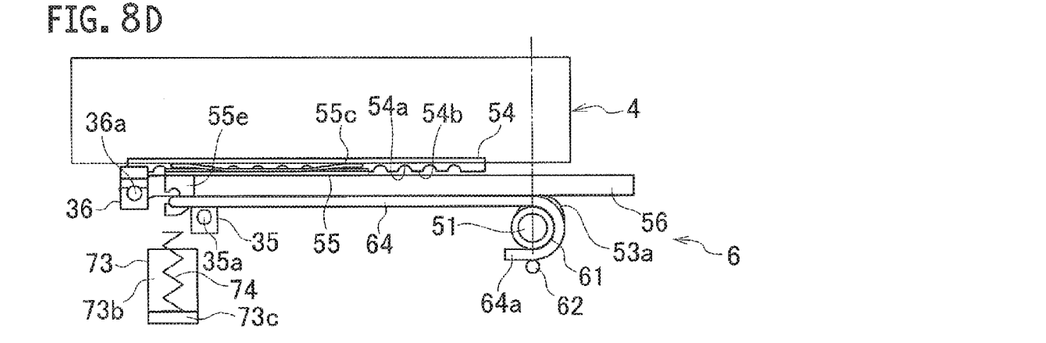
FIG. 8D is a schematic diagram illustrating a condition where an impact applied to the inner column is absorbed.

In a steering column device 201 of a second conventional example described in Patent Document 2 (JP 2005/001517 A), as illustrated in FIG. 2, a restricting member 273 is disposed projectably/sinkably in relation to an inner column 204 in association with an operating lever 251a of a fastening member 205. In a locked state where the fastening member 205 fastens an outer column 203 to the inner column 204, the restricting member 273 is maintained in a position separated away from the inner column 204. In an unlocked state where the lock state is released, the fastening member 205 is displaced to a position to restrict the moving range of the inner column 204.

SUMMARY

In the steering column device 101 of the first conventional example disclosed in Patent Document 1, incidentally, there exists a problem that an impact absorbing load increases instantaneously in the middle of absorbing the impact energy because the restricting member 173 is fractured while the inner column 104 is contracting.

The problem that Patent Document 1 confronts could be resolved by adopting the structure of the restricting member 273 of the steering column device 201 of the second conventional example described in Patent Document 2. Nevertheless, in the configuration of Patent Document 2, the position of the restricting member 273 is not stabilized since the operating lever 251a is not fixed in the unlocked state where the restricting member 273 restricts the moving range of the inner column 4. Furthermore, in the configuration of Patent Document 2, there is the possibility that if the inner column 4 collides with the restricting member 273 in the course of performing the positional adjustment of the inner column 204, the load at the collision cannot be received by the movable restricting member 273.

In consideration of the above-mentioned situation, an object of the present application is to provide a steering column device which can restrict the position of the inner column reliably and which does not increase an impact absorbing load in the middle of absorbing the impact energy.

A steering column device according to an aspect of the present application includes: an outer column having a cylindrical shape and arranged along a vehicle longitudinal direction; an inner column having a cylindrical shape and inserted into the outer column so as to be movable in a cylinder-axis direction of the outer column; a lock mechanism having an operating lever operable to a locked position to fasten the inner column to the outer column and an unlocked position to allow the inner column to be adjusted in a cylinder-axis direction of the outer column; a restricting member penetrating through a cylinder wall of the outer column from a side of an outer circumferential face of the outer column and held in a restricting position where the restricting member can be engaged with the inner column, the restricting member being also separable from the restricting position; an auxiliary restricting member engaging with the restricting member and held in a holding position to hold the restricting member in the restricting position; and a coupling mechanism which couples the auxiliary restricting member with the inner column when the lock mechanism is in the locked position, wherein when a load exceeding a set value is applied to the inner column in the cylinder-axis direction, the auxiliary restricting member moves together with the inner column, and the auxiliary restricting member and the restricting member are disengaged from each other, whereby the restricting member is separated from the restricting position where the restricting member can be engaged with the inner column Since the restricting member is held in the restricting position where it can be engaged with the inner column by the auxiliary restricting member, it is possible to perform the positional restriction of the inner column reliably. Additionally, when the load exceeding the set value is applied to the inner column in the cylinder-axis direction under condition that the lock mechanism is in the locked position, the auxiliary restricting member moves together with the inner column to leave its engagement with the restricting member, so that it departs from the restricting position. Thus, the inner column can move to the front of the vehicle over the telescopic moving range and additionally, the stable impact absorption can be carried out without increasing the impact absorbing load in the middle of absorbing the impact energy.

The restricting member may be arranged so as to penetrate through the cylinder wall of the outer column upward from below.

With the arrangement where the front stopper penetrates through the cylinder wall from the lower side to the upper side, when the auxiliary restricting member departs from the holding position, the restricting member falls off by gravity and departs from the restricting position. Therefore, it is possible to simplify the constitution of the restricting mechanism.

The steering column device may further include an urging member configured to urge the restricting member from the side of the restricting position toward a departure position where the restricting member and the inner column are disengaged from each other.

Since the restricting member is urged from the side of the restricting position to the side of the departure position, the restricting member departs from the restricting position due to an urging force of the urging member when the auxiliary restricting member leaves the holding position. Thus, it is possible to move the restricting member to the departure position more reliably with the relatively-simple constitution of the restricting mechanism.

The auxiliary restricting member may be an impact absorbing member which is composed of a wire material and arranged so as to be folded back by an operating shaft of the lock mechanism and extend to a front side of the vehicle and which has one end fixed to the inner column through the coupling mechanism. In this case, the restricting member is held in the restricting position by the other end of the impact absorbing member.

Since the auxiliary restricting member is set to the front end portion of the impact absorbing member, it is possible to absorb the impact energy while simplifying the constitution of the restricting mechanism.

The steering column device may further include: a slit penetrating through the cylinder wall of the outer column along the cylinder-axis direction; a pair of clamp parts formed so as to stand on both marginal parts of the slit along the cylinder-axis direction; the lock mechanism including an operating shaft having a shaft shape and arranged so as to penetrate through the pair of clamp parts and the operating lever arranged on the operating shaft, the lock mechanism being configured to narrow an interval between the pair of clamp parts by rotating the operating lever about an axis of the operating shaft in a fastening direction, thereby fastening the inner column to the outer column; an eccentric cam member arranged so as to be rotatable together with the operating shaft about the axis, the eccentric cam member having an eccentric cam formed on an outer circumferential face of the eccentric cam member; a lock plate formed by a strip-shaped plate material which is arranged on the outer circumferential face of the inner column along the cylinder-axis direction to have a plurality of lock holes consecutively opening in the longitudinal direction of the lock plate, thereby providing the lock plate with a ladder shape; a support lever having one end swingably supported to the outer column and the other end arranged between the eccentric cam member and the inner column along the cylinder-axis direction; a claw plate arranged between the lock plate and the support lever to have one or more lock claws each composed of an elastic piece engageable with and disengageable from the lock holes; an impact absorbing member constructed by engaging one end of the auxiliary restricting member with the claw plate and engaging the other end of the auxiliary restricting member with the outer column; and an impact absorbing mechanism configured so that a rotational operation of the operating shaft to the fastening direction causes the eccentric cam to press the claw plate against the lock plate through the support lever and the lock claws to shift the locked position capable to engage the lock claws and the lock holes, and that, when a load exceeding a set value is applied to the inner column in the cylinder-axis direction, the lock claw engages with the lock hole to cause the claw plate to move together with the inner column in the cylinder-axis direction and also deform the impact absorbing member, thereby absorbing impact energy. In this case, the auxiliary restricting member may be a wire material bent in a substantially U-shaped form, the wire material may include horizontal rod portions which are locked to a pair of supporting members provided in the claw plate and a longitudinal rod portion which is folded back about the operating shaft, and ends of the wire material may be subsequently extended to the front side of the vehicle and locked to the outer column. Additionally, the claw plate may have a plurality of claws' rows provided adjacently in the direction of the operating shaft, each of the claws' rows being composed of the plurality of lock claws continuing in the cylinder-axis direction at different intervals from the lock holes, and the claws' rows may be disposed shifted from each other in the cylinder-axis direction.

DESCRIPTION OF EMBODIMENTS

An embodiment will be described with reference to the drawings. As illustrated in FIGS. 3 to 7 and 8A to 8D, a steering column device 1 according to the embodiment is a manual type steering column device. The steering column device 1 according to the embodiment includes an attachment bracket 2 for fixing the steering column device 1 to a vehicle body, an outer column 3 which is supported to the attachment bracket 2 so as to be swingable (capable of adjusting its tilt position) in a vehicle vertical direction, an inner column 4 supported to the outer column 3, a lock mechanism 5 which fastens the attachment bracket 2, the outer column 3, and the inner column 4 integrally, an impact absorbing mechanism 6 which absorbs impact energy applied to the inner column 4, and a restricting mechanism 7 capable of setting the adjustment range of the position (telescopic-position) of the inner column 4 to the outer column 3 in a vehicle longitudinal direction.

The attachment bracket 2 includes a front-side fixing part 21a and a rear-side fixing part 21b which are fixed to a ceiling plane (not illustrated) of the vehicle body. The front-side fixing part 21a includes a pivot part 23 which swingably supports the outer column 3. The rear-side fixing part 21b includes a pair of hanging parts 22 hanging from left and right marginal parts of the rear-side fixing part 21b. Each of the hanging parts 22 is provided with a tilt slot 24 opened to define the tilt-position adjustment range along the vehicle vertical direction (tilting direction). Each tilt slot 24 is composed of an arcuate elongated holes centered on the pivot part 23.

The outer column 3 has a cylindrical shape and is arranged between the pair of hanging parts 22 along the vehicle longitudinal direction. The outer column 3 is provided, at its upper marginal portion on the front-end side, with a pivot receiving part 30. Since the pivot receiving part 30 is swingably supported by the pivot part 23 of the attachment bracket 2 through a bolt 23a, the rear-end side of the outer column 3 swings in the vehicle vertical direction.

The outer column 3 is provided with a slit 31 which penetrates through a lower face of a cylinder wall 3a and extends from a rear edge of the outer column 3 along a cylinder-axis direction. The dimension of the slit 31 in the cylinder-axis direction is established so that the slit 31 extends from the outer column's rear edge up to an outer column's portion corresponding to the front end of the inner column 4 under condition that the inner column 4, which has been inserted into the outer column 3 through its rear end, is shrunk to the utmost extent after absorbing the impact energy.

A pair of clamp parts 32 are formed so as to stand on both marginal parts of the slit 31 along the cylinder-axis direction. Both of the clamp parts 32 are positioned on the rear-end side of the slit 31 and formed to stand on respective outer-column's portions opposed to the hanging parts 22 along the vehicle vertical direction. An operating shaft 51 penetrates through the clamp parts 32 rotatably about an axis of the operating shaft 51.

On respective front end portions of both marginal parts of the slit 31 along the cylinder-axis direction, a pair of lever supporting parts 36 are formed so as to stand downwardly. Behind the lever supporting parts 36, a pair of front-end holding parts 35 are formed so as to stand downwardly. A holding beam 35a is stretched between the front-end holding parts 35.

The inner column 4, which has a cylindrical shape, is inserted into the cylindrical outer column 3 movably in the outer column 3 in the cylinder-axis direction. Inside both cylinders of the inner column 4 and the outer column 3, a steering shaft 11 is supported. The steering shaft 11 includes a lower shaft 11L rotatably supported in the outer column 3 and an upper shaft 11U rotatably supported in the inner column 4. Since the upper shaft 11U and the lower shaft 11L are spline-connected to each other, the steering shaft 11 is configured so that the upper shaft 11U and the lower shaft 11L can rotate around their axes integrally, while the upper shaft 11U can move in relation to the lower shaft 11L in the axial direction.

The lock mechanism 5 includes an operating lever 51a, the operating shaft 51, a stationary cam 52a, and a rotational cam 52b. All of the operating shaft 51, an eccentric cam member 53, a lock plate 54, a claw plate 55, and a support lever 56 constitute a coupling mechanism 5b.

The operating shaft 51 has a shaft-shape. The operating shaft 51 penetrates through the tilt slots 24 of both hanging parts 22 and both clamp parts 32 of the outer column 3 along a vehicle width direction, and is supported rotatably around an axis of the shaft. A washer that engages with an outer face of the right-side hanging part 22R is fixed to one end of the operating shaft 51 (on one-end side) by a nut, through a thrust bearing. On the other end of the operating shaft 51 (on another-end side), a cam member 5a and the operating lever 51a are disposed between a head part provided integrally with the operating shaft 51 and an outer face of the left-side hanging part 22L. The cam member 5a is positioned on the operating shaft 51 between the operating lever 51a and the left-side hanging part 22L. The cam member 5a is composed of the stationary cam 52a and the rotational cam 52b. The eccentric cam member 53 is also arranged on the operating shaft 51 between both clamp parts 32 so as to be rotatable integrally with the operating shaft 51.

The stationary cam 52a has a wide circular shape. The operating shaft 51 is arranged so as to penetrate through a center of the so-formed stationary cam 52a. The stationary cam 52a is arranged so that its stationary cam face faces the side of the operating lever 51a. With the back side of the stationary cam face fitted into the tilt slot 24, the stationary cam 52a is arranged so as not to rotate around the operating shaft 51. Instead, the stationary cam 52a is arranged so as to be movable in the tilt slot 24 vertically. On the stationary cam face of the stationary cam 52a, crest parts and trough parts are formed in the circumferential direction alternately.

The rotational cam 52b has a wide circular shape. The operating shaft 51 is also arranged so as to penetrate through a center of the so-formed rotational cam 52b. The rotational cam 52b is arranged so that its rotational cam face faces the stationary cam face of the stationary cam 52a. The rotational cam 52b is joined to the operating lever 51a so as to be rotatable integrally with the lever 51a. Additionally, the rotational cam 52b is assembled to the operating shaft 51 so as to rotate together with the operating shaft 51 penetrating through the rotational cam 52b, around the axis of the operating shaft 51. On the rotational cam face of the rotational cam 52b, crest parts and trough parts are formed in the circumferential direction alternately.

The eccentric cam member 53 has a nearly cylindrical shape. On an outer circumferential face of the eccentric cam member 53, an eccentric cam 53a is formed so as to project in the radial direction. In order to allow the eccentric cam member 53 to rotate together with the operating shaft 51 about its axis, the operating shaft 51 is inserted and fitted to the eccentric cam member 53.

The lock plate 54 is composed of a strip-shaped plate material circularly-curved in the width direction and also arranged on the outer circumferential face of the inner column 4 along the cylinder-axis direction. In the lock rack plate 54, a plurality of lock holes 54a are consecutively formed in the longitudinal direction of the lock plate 54, providing it with a ladder shape.

The claw plate 55 has a plurality of lock claws 55b, elastic arm parts 55c, and supporting members 55e, each formed on a substrate 55a made from a rectangular plate material having elasticity.

Each of the lock claws 55b is composed of an elastic piece whose portion on the vehicle rear side is cut in and obliquely raised from the substrate 55a toward the lock plate 54 so as to be insertable into the lock hole 54a. The lock claws 55b constitute a claws' row 55d since the plural lock claws 55b are consecutively cut in and raised at regular intervals in the cylinder-axis direction so as to be engageable with the plural lock holes 54a in the lock plate 54 simultaneously. In the substrate 55b, a similar claws' row 55d is provided adjacent to the former claws' row 55d in the direction of the operating shaft. These claws' rows 55d are established so that intervals of the lock claws 55b in the cylinder-axis direction are shifted from each other by a half of a distance between the adjoining lock claws 55b.

The elastic arm parts 55c are composed of elastic pieces which are cut in and raised in four corners of the claw plate 55 so as to come in contact with the outer circumferential face of the inner column 4 and also get higher and obliquely-longer than the lock claws 55b.

The supporting members 55e are one pair of hook-shaped members obtained by bending both sides of the front end of the claw plate 55 at a substantially right angle downwardly, providing a locking part for a later-mentioned impact absorbing wire 64.

The support lever 56 is composed of a rail-shaped member having a rectangular cross section and arranged in the slit 31 along the cylinder-axis direction so as to become approximately parallel to the inner column 4 when the lock mechanism 5 is locked. The support lever 56 has its one end swingably supported to the lever supporting parts 36 on the outer circumference of the outer column 3 and the other end held between the eccentric cam member 53 and the claw plate 55. In connection, the eccentric cam member 53 and the support lever 56 are arranged so as to rotate between the pair of supporting members 55e. By adopting a structure to press the claw plate 55 against the lock plate 54 through the support lever 56, the force (frictional force) of the eccentric cam member 53 in the rotating direction is not transmitted to the claw plate 55, while only the force of the eccentric cam member 53 in the radial direction is transmitted to the claw plate 55. Consequently, when performing the locking operation, the inner column 4 can be fixed without being shifted from the desired position in the cylinder-axis direction.

In order to squeeze the impact absorbing wire 64 for bending deformation, the impact absorbing mechanism 6 includes squeezing parts 61, an auxiliary shaft 62 and the impact absorbing wire 64.

Each of the squeezing parts 61 has a cylindrical shape. Integrated with the eccentric cam member 53, the squeezing parts 62 are positioned on both sides of the eccentric cam 53a.

The auxiliary shaft 62 is arranged between the pair of clamp parts 32 so as to be parallel with the operating shaft 51. Also, the auxiliary shaft 62 are arranged in an area which overlaps with the operating shaft 51 in the cylinder-axis direction while leaving a space (gap) between the squeezing parts 61 and the auxiliary shaft 62, which allows an insertion of the impact absorbing wire 64 thereinto.

The impact absorbing wire 64 has a substantially U-shaped form obtained by bending a wire material double. In the impact absorbing wire 64, its twofold section forming a horizontal rod portion on one-end side is locked and fixed to the pair of supporting members 55e, while a parallel section forming a longitudinal rod portion on the other-end side is extended toward a rear of the vehicle along the cylinder-axis direction. The parallel section of the impact absorbing wire 64 is routed in front of the vehicle through the gap between the squeezing parts 61 and the auxiliary shaft 62 while being folded back so as to be wound around the squeezing parts 61. In the impact absorbing wire 64 routed in front, as the front end portion of the parallel section is arranged between the holding beam 35a and the slit 31 of the outer column 3, the parallel section is routed along the cylinder-axis direction and also engaged to/held by the holding beam 35a owing to an elastic force of the impact absorbing wire 64. The impact absorbing wire 64 absorbs the impact energy since it is deformed while being squeezed by the squeezing parts 61.

The restricting mechanism 7 of the telescopic position includes a telescopic slot 71, a rear stopper 72, and a front stopper 73 as the restricting member.

In the ceiling portion of the outer column 3, the telescopic slot 71 is provided in the form of an elongated hole extending along the cylinder-axis direction while penetrating through the cylinder wall 3a of the outer column 3. The dimension of the telescopic slot 71 in the cylinder-axis direction is established so that the stopper 41 projecting on the top face of the inner column 4 does not abut on the end faces in the entire area of the telescopic-position adjustment range and the entire area of the impact absorbing range and additionally, the front side of the slot 71 in the cylinder-axis direction becomes broader than the impact absorbing range.

The rear stopper 72 is formed by an end face of the telescopic slot 71 on the vehicle rear side. The stopper 41 projecting on the ceiling portion of the outer circumferential face of the inner column 4 abuts on the rear stopper 72.

The front stopper 73 has a substantially U-shaped form composed of a shaft-shaped main body 73a and one pair of leg parts 73b extending from the main body 73a, in parallel with each other. The front stopper 73 is arranged in a restricting position corresponding to the front end portion of the slit 31 in the cylinder-axis direction so as to be freely inserted into and removed from the outer circumferential face of the outer column 3 along a direction to penetrate through the cylinder wall 3a, while interposing the support lever 56 between the leg parts 73b. The position of the front stopper 73 in the longitudinal direction of the cylinder axis is defined since it is disposed between the front-end holding parts 35 and the lever supporting parts 36 of the outer column 3. The position of the front stopper 73 in the horizontal direction is defined since it is disposed in the slit 31. The position of the front stopper 73 in the vertical direction is defined since it is supported by front end portions 64a of the impact absorbing wire 64 from below. That is, the front end portions 64a of the impact absorbing wire 64 serve as an auxiliary restricting member. The front stopper 73 has one pair of receiving parts 73c formed integrally therewith so as to project in the horizontal direction. Under condition that the front stopper 73 is arranged in the restricting position and supported by the front end portions 64a of the impact absorbing wire 64, departure springs 74 of coil springs, as an urging member, are held between the receiving parts 73c and the outer circumferential face of the outer column 3 in a compressed state.

By the restricting mechanism 7 for the telescopic position, the rear-end side of the telescopic-position adjustment range is defined since the rear stopper 72 engages with the rear edge of the telescopic slot 71 when moving the inner column 4 backward in the cylinder-axis direction. Similarly, the front-end side of the telescopic-position adjustment range is defined since the front end of the inner column 4 engages with the front stopper 73 when moving the inner column 4 forward in the cylinder-axis direction.

Next, the assembling sequence of the steering column device 1 according to the embodiment will be described. First, it is carried out to insert the inner column 4 into the cylinder of the outer column 3 while inserting the lock plate 54 fixed to the inner column 5 into the slit 31 of the outer column 3 and further assemble the stopper 41 to the outer column 3.

Subsequently, it is carried out to dispose the outer column 3 between the hanging parts 22 of the attachment bracket 2. Using a suspension spring 14, it is then performed to allow the attachment bracket 2 to suspend the outer column 3 while allowing the pivot part 23 of the attachment bracket 2 to support the pivot receiving part 30 of the outer column 3.

Additionally, the support lever 56 is arranged on the lever supporting parts 36 swingably through the lever pin 36a.

Then, the claw plate 55 is arranged between the rear-end side of the support lever 56 and the lock plate 54 and additionally, the eccentric cam member 53 where the impact absorbing wire 64 is wound around the squeezing parts 61 is disposed under the support lever 56. Subsequently, it is performed to fix the twofold section (on one side) of the impact absorbing wire 64 to the supporting members 55e while inserting the parallel section of the impact absorbing wire 64 into the gap between the eccentric cam member 53 and the inner column 4 from the front side toward the rear side.

Next, it is performed to assemble the operating shaft 51 to the attachment bracket 2 and the outer column 3 while allowing the operating shaft 51 to penetrate through the eccentric cam member 53. The operating shaft 51 penetrates through the operating lever 51a, the rotational cam 52b, the stationary cam 52a, the tilt slot 24 of the left-side hanging part 22L, the left-side clamp part 32L, the eccentric cam member 53, the right-side clamp part 32R, and the tilt slot 24 of the right-side hanging part 22R, in this order from the left side in FIG. 6. Outside the right-side hanging part 22R, additionally, the operating shaft 51 is inserted into the washer and the thrust bearing and finally thread-engaged with the nut.

Then, the impact absorbing wire 64 is folded back while being wound around the squeezing parts 61 and successively, the parallel section of the impact absorbing wire 64 is routed forward through the gap between the squeezing parts 61 and the auxiliary shaft 62. Then, the end of the parallel section of the impact absorbing wire 64 routed forward is locked and held by the holding beam 35a of the outer column 3, while the lower face of the front stopper 73 is supported by the front-end portions of the impact absorbing wire 64. Additionally, with the lower shaft 11L spline-connected to the upper shaft 11U, it is inserted into the outer column 3 from the front side and successively, the lower shaft 11L is supported by an outer bearing (not illustrated) so as to be rotatable in the cylindrical outer column 3. Similarly, the upper shaft 11U is also supported by an inner bearing 13 so as to be rotatable in the cylindrical inner column 4.

Next, the operating sequence of the steering column device 1 according to the embodiment will be described.

In order to fix the inner column 4 in a desired position, it is performed to move the inner column 4 in the tilt direction (vehicle vertical direction) and in the telescopic direction (vehicle longitudinal direction), thereby swinging the operating lever 51a upwardly. By operating to swing the operating lever 51a upwardly, the operating shaft 51 is rotated about its axis in the fastening direction.

As the rotational cam 52b integrated with the operating lever 51a is rotated in the fastening direction together with the operating shaft 51, the crest parts of the stationary cam 52a and the crest parts of the rotational cam 52b overlaps each other to increase the axial dimension of the cam member 5a. Consequently, the operating shaft 51 is pulled toward the cam member 5a, so that the hanging parts 22 and the clamp parts 32 are brought into pressure contact with each other and additionally, the outer column 3 is maintained in an arbitrary tilt position. Simultaneously, with the interval between the pair of clamp parts 32 narrowed, the diameter of the outer column 3 is reduced, so that the inner column 4 is held in an arbitrary telescopic position.

Further, with the rotation of the operating shaft 51 in the fastening direction, the coupling mechanism 5b allows a rotation of the eccentric cam member 53, so that the eccentric cam 53a presses the claw plate 55 against the lock plate 54 through the support lever 56. With the operation to press the claw plate 55 against the lock plate 54, any lock claw 55b is inserted into any lock hole 54a, so that the tip of the inserted lock claw 55b becomes engageable with ribs 54b that divide off the respective lock holes 54a. In connection, if the other lock claw 55b is located on the rib 54b in pressing the claw plate 55 against the lock plate 54, this lock claw 55b makes the elastic deformation so as to retreat in opposition to the pressing direction while being pressed against the rib 54b. Owing to this elastic deformation, the operation of rotating the operating shaft 51 is no longer interrupted and accordingly, any of the lock claws 55b engages with the rib 54b.

In order to adjust the position of the inner column 4, the fastening state between the inner column 4 and the outer column 3 is cancelled. For this purpose, it is first performed to swing the operating lever 51a downward (i.e. in the canceling direction). By operating to swing the operating lever 51a downward, the operating shaft 51 rotates about its axis in the direction to cancel the fastening state.

As the rotational cam 52b integrated with the operating lever 51a is rotated together with the operating shaft 51 in the direction to cancel the fastening state, the crest parts of the stationary cam 52a and the trough parts of the rotational cam 52b overlaps each other to reduce the axial dimension of the cam member 5a. Consequently, the operating shaft 51 is loosened so as to cancel the pressure contact between the hanging parts 22 and the clamp parts 32, so that the outer column 3 becomes possible to move to the attachment bracket 2 in the tilt direction (vehicle vertical direction). Simultaneously, with the interval between the pair of clamp parts 32 expanded, the diameter of the outer column 3 is enlarged, so that the inner column 4 becomes possible to move in the telescopic direction (vehicle longitudinal direction).

With the rotation of the operating shaft 51 in the direction to cancel the fastening state, the eccentric cam member 53 of the coupling mechanism 5b rotates to cause the eccentric cam 53a to be moved in a direction leaving from the outer circumferential face of the inner column 4. Then, due to the elastic force of the elastic arm parts 55c, the lock claws 55b separate from the lock holes 54a, so that the locking state is cancelled.

Under condition that the inner column 4 is fastened to the outer column 3 by operating the operating lever 51a, if an impact load exceeding a set value is applied to the inner column 4, then the twofold section of the impact absorbing wire 64, which is fixed to the supporting members 55e of the claw plate 55 engaged with the inner column 4 integrally, moves together with the inner column 4 forward in the cylinder-axis direction since the lock claw 55b in engagement with the lock hole 54a is pushed by the adjoining rib 54b. Then, the parallel section of the impact absorbing wire 64 is pulled by the twofold section to move backward in the cylinder-axis direction, so that the front end portions 64a separate from the front stopper 73. As a result, the front stopper 73 falls off from the slit 31 by gravity and compression reaction force of the departure springs 74. Then, when the inner column 4 moves forward in the cylinder-axis direction together with the twofold section of the impact absorbing wire 64, the impact absorbing wire 64 is bent and deformed while being squeezed by the squeezing parts 61 and the auxiliary shaft 62, thereby absorbing the impact energy. In this way, since the front stopper 73 departs from the position in engagement with the inner column 4, the obstacle to inhibit the contraction of the inner column 4 forward in the cylinder-axis direction over the telescopic range is eliminated. Thus, the inner column 4 can be contracted without increasing the impact load in the middle of the inner column's contraction.

Meanwhile, if an impact load exceeding the set value is applied to the inner column 4 under condition that the front end of the inner column 4 is abutting on the front stopper 73 due to the telescopic-position adjustment, the inner column 4 breaks the front stopper 73 with the impact load, thereby allowing the inner column 4 to be moved forward in the cylinder-axis direction. Thus, if the impact load exceeding the set value is applied to the inner column 4 under condition that the front end of the inner column 4 is abutting on the front stopper 73 due to the telescopic-position adjustment, there is no possibility of increasing the impact load in the middle of the inner column's contraction because the front stopper 73 is broken by the impact load.

With the steering column device 1 according to the embodiment, since the front stopper 73 is held in the restricting position where it can be engaged with the inner column 4 by the front end portions 64a of the impact absorbing wire 64, it is possible to perform the positional restriction of the telescopic-position range of the inner column 4 reliably. When the load exceeding the set value is applied to the inner column 4 in the cylinder-axis direction under condition that the lock mechanism 5 is in the locked position, the impact absorbing wire 64 moves together with the inner column 4 so that the front end portions 64a disengage from the front stopper 73, thereby allowing a departure of the front stopper 73 from the restricting position. Thus, the inner column 4 can move to the front of the vehicle over the telescopic-position adjustment range and additionally, the stable impact absorption can be carried out without increasing the impact absorbing load in the middle of absorbing the impact energy.

With the arrangement where the front stopper 73 penetrates through the cylinder wall 3a from the lower side to the upper side, as the restricting mechanism 7 is constructed so that the front stopper 75 falls off by gravity and departs from the restricting position when the front end portions 64a of the impact absorbing wire 64 depart from their holding position, the constitution of the restricting mechanism 7 can be simplified.

With the arrangement where the front stopper 73 is urged to a direction to depart from the restricting position by the departure springs 74, as the restricting mechanism 7 is constructed so that the front stopper 73 leaves the restricting position also by the urging force of the departure springs 74 when the front end portions 64a of the impact absorbing wire 64 depart from their holding position, it is possible to separate the front stopper 74 from the restricting position more reliably with the relatively-simple constitution of the restricting mechanism 7.

Since the auxiliary restricting member is set to the front end portions 64a of the impact absorbing wire 64, it is possible to absorb the impact energy while simplifying the constitution of the restricting mechanism 7.

Although the steering column device 1 according to the embodiment employs the front end portions 64a of the impact absorbing wire 64 as the auxiliary restricting member, the invention is not limited to only this embodiment. That is, as long as, when absorbing the impact, a certain element moves together with the inner column 4 without interrupting its forward movement and further departs from the front stopper 73, the same element would be applicable to the invention and additionally, similar effects to the embodiment could be obtained.

What is claimed is:

1. A steering column device, comprising:
    an outer column having a cylindrical shape and arranged along a vehicle longitudinal direction;
    an inner column having a cylindrical shape and inserted into the outer column so as to be movable in a cylinder-axis direction of the outer column;
    a lock mechanism having an operating lever operable to a locked position to fasten the inner column to the outer column and an unlocked position to allow the inner column to be adjusted in a cylinder-axis direction of the outer column;
    a restricting member penetrating through a cylinder wall of the outer column from a side of an outer circumferential face of the outer column and held in a restricting position where the restricting member can be engaged with the inner column, the restricting member being also separable from the restricting position;
    an auxiliary restricting member engaging with the restricting member and held in a holding position to hold the restricting member in the restricting position; and
    a coupling mechanism which couples the auxiliary restricting member with the inner column when the lock mechanism is in the locked position, wherein
    when a load exceeding a set value is applied to the inner column in the cylinder-axis direction, the auxiliary restricting member moves together with the inner column, and the auxiliary restricting member and the restricting member are disengaged from each other, whereby the restricting member is separated from the restricting position where the restricting member can be engaged with the inner column.

2. The steering column device of claim 1, wherein
    the restricting member is arranged so as to penetrate through the cylinder wall of the outer column upward from below.

3. The steering column device of claim 1, further comprising
    an urging member configured to urge the restricting member from the side of the restricting position toward a departure position where the restricting member and the inner column are disengaged from each other.

4. The steering column device of claim 1, wherein
    the auxiliary restricting member is an impact absorbing member which is composed of a wire material and arranged so as to be folded back by an operating shaft of the lock mechanism and extend to a front side of the vehicle and which has one end fixed to the inner column through the coupling mechanism, and
    the restricting member is held in the restricting position by the another end of the impact absorbing member.

5. The steering column device of claim 1, further comprising:
    a slit penetrating through the cylinder wall of the outer column along the cylinder-axis direction;
    a pair of clamp parts formed so as to stand on both marginal parts of the slit along the cylinder-axis direction;
    the lock mechanism comprising an operating shaft having a shaft shape and arranged so as to penetrate through the pair of clamp parts and the operating lever arranged on the operating shaft, the lock mechanism being configured to narrow an interval between the pair of clamp parts by rotating the operating lever about an axis of the operating shaft in a fastening direction, thereby fastening the inner column to the outer column;

an eccentric cam member arranged so as to be rotatable together with the operating shaft about the axis, the eccentric cam member having an eccentric cam formed on an outer circumferential face of the eccentric cam member;

a lock plate formed by a strip-shaped plate material which is arranged on the outer circumferential face of the inner column along the cylinder-axis direction to have a plurality of lock holes consecutively opening in the longitudinal direction of the lock plate, thereby providing the lock plate with a ladder shape;

a support lever having one end swingably supported to the outer column and the other end arranged between the eccentric cam member and the inner column along the cylinder-axis direction;

a claw plate arranged between the lock plate and the support lever to have one or more lock claws each composed of an elastic piece engageable with and disengageable from the lock holes;

an impact absorbing member constructed by engaging one end of the auxiliary restricting member with the claw plate and engaging the other end of the auxiliary restricting member with the outer column; and an impact absorbing mechanism configured so that a rotational operation of the operating shaft to the fastening direction causes the eccentric cam to press the claw plate against the lock plate through the support lever and the lock claws to shift the locked position capable to engage the lock claws and the lock holes, and that, when a load exceeding a set value is applied to the inner column in the cylinder-axis direction, the lock claws engage with the lock holes to cause the claw plate to move together with the inner column in the cylinder-axis direction and also deform the impact absorbing member, thereby absorbing impact energy.

6. The steering column device of claim 5, wherein
the auxiliary restricting member is a wire material bent in a substantially U-shaped form,
the wire material includes horizontal rod portions which are locked to a pair of supporting members provided in the claw plate and a longitudinal rod portion which is folded back about the operating shaft, and
ends of the wire material are subsequently extended to the front side of the vehicle and locked to the outer column.

7. The steering column device of claim 5, wherein
the claw plate has a plurality of claws' rows provided adjacently in a direction of the operating shaft, each of the claws' rows being composed of the plurality of lock claws continuing in the cylinder-axis direction at different intervals from the lock holes, and
the claws' rows are disposed shifted from each other in the cylinder-axis direction.

* * * * *